Dec. 15, 1931.  E. KLEPETKO  1,836,975
RECOVERY OF VOLATILE METALS
Filed Dec. 29, 1928
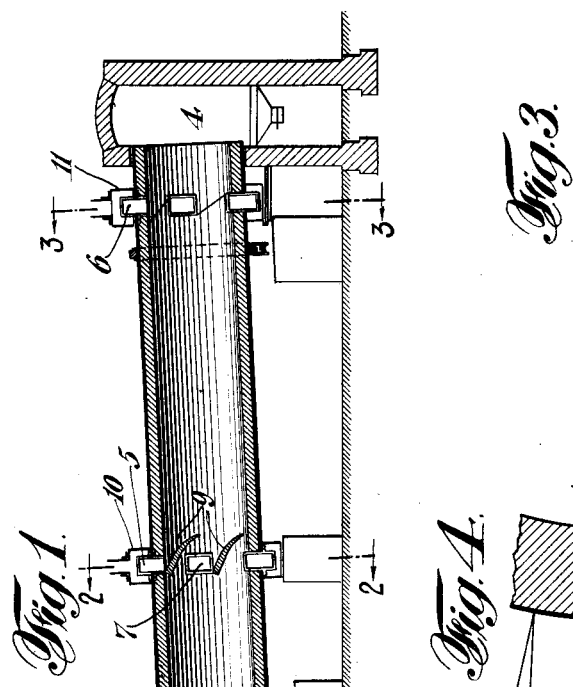
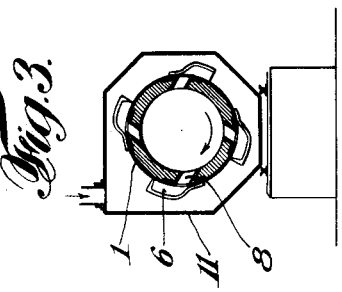
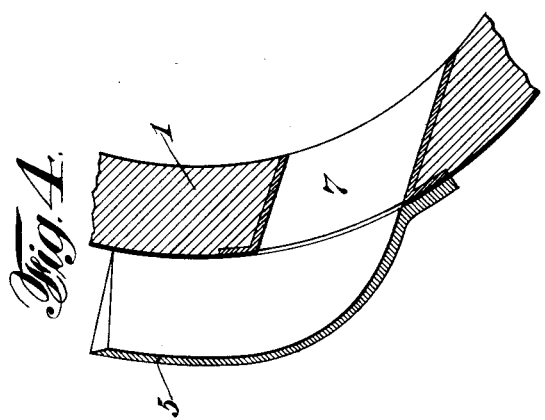
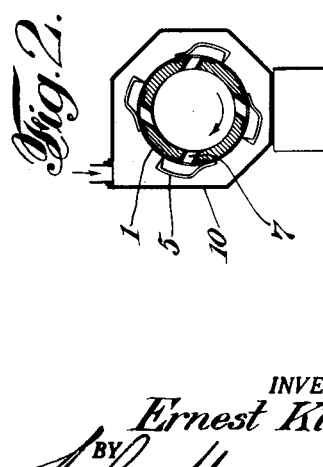
INVENTOR.
Ernest Klepetko
BY
Anthony Alvina ATTORNEY Patented Dec. 15, 1931

1,836,975

UNITED STATES PATENT OFFICE

ERNEST KLEPETKO, OF ANACONDA, MONTANA

RECOVERY OF VOLATILE METALS

Application filed December 29, 1928. Serial No. 329,194.

Recent developments in the metallurgy of many non-ferrous metals have shown that a satisfactory recovery and concentration can be obtained by the reduction of their ores with coke or other carbonaceous material, accompanied by the simultaneous oxidation of the volatilized metal. These gasous oxides are recovered in any suitable manner. Zinc, lead, silver, arsenic and cadmium are particularly amenable to such treatment. The recently developed Waelz process exemplifies such a process and is covered by Patent No. 1,618,204, granted February 22, 1927.

In this process, oxidized and semi-oxidized ores containing lead, zinc, and silver are mixed with fine coke or similar reducing material and fed to a revolving furnace of the cement kiln type. At the discharge end of the furnace heat is applied, usually by fuel oil or coal dust firing. As the charge gradually becomes hotter in passing through the furnace, the metals contained therein, due to their rolling in intimate contact with the reduction material, are reduced to the metallic state and vaporized. The presence of oxygen in the gases immediately oxidizes this metallic vapor which leaves the furnace together with the gaseous products of combustion.

The metallic oxide fumes are readily separated from the other gases in baghouses or electrical precipitators and provide ideal material for subsequent recovery as metal by hydro or pyrometallurgical processes.

The presence of an excess of reduction material in the charge is necessary. This material is largely burned out and generates much heat which must be dissipated. The exit gases from the furnace have a temperature of 500° to 700° C. This gas must be further cooled before the fumed metals can be precipitated or filtered from it.

The presence of iron and sulphur or of much lead and sulphur together is objectionable on account of the low fusion temperature of both iron and lead sulphides. The melting point of both is well below the operating temperature of the furnace. Under the reducing conditions existing in the charge layer, the formation or existence of these sulphides is inevitable. They either form incrustations in the furnace which are difficult and expensive to remove or they result in the loss of the valuable metals which are lost in the residues, or in a combination of both these conditions. Within narrow limits, the presence of sulphur can be tolerated. Above these limits, however, and especially in the presence of much iron or lead, these molten sulphides are formed and the ordinary time of treatment is insufficient to permit of their oxidation and the subsequent reduction of the oxides.

I propose to avoid these disadvantages by a preliminary calcining and oxidizing operation. On such low grade ores as are amenable to this process, a separate oxidation before reduction and volatilization is comparatively expensive and may be economically impracticable. I propose, however, to secure this preliminary treatment most economically by utilizing the waste heat from the reduction step and by feeding the charge continuously through the preliminary and the final operations.

The accompanying drawings illustrate an apparatus for carrying out the process.

Fig. 1 is a longitudinal section;

Figs. 2 and 3 are, respectively, cross-sections on the correspondingly numbered lines in Fig. 1;

Fig. 4 is an enlargement of a detail.

The kiln 1 is of the usual cement kiln type, a long inclined tube lined with refractory material, rotated slowly. The solid material is discharged at the lower end through a chamber 2. A burner 3 projects a hot flame of coal dust or other fuel into the lower end and the hot gases pass through the kiln and out of its upper end into the chamber 4 and thence to the baghouse or other apparatus. The ore is introduced at the upper end, at the line 3—3; the necessary finely ground coke or coal for reduction is introduced at the section 2—2.

In the ordinary Waelz process, the length of the kiln would be approximately that from the section line 2—2 to the lower end. To this I have added the length between the lines 2—2 and 3—3.

The furnace conditions below the point of admission of the reducing material, due to the heating caused by the reaction and oxidation of the excess reducing material as well as the external fuel added through the burner 3, will produce a temperature in the gases at the point 2—2 of 600 to 900 degrees C. These hot gases are applied directly and immediately to the ore in the upper zone to oxidize the sulphur therein and to leave the metallic contents in an oxidized state. The ore is in this condition when the reducing material is added at the point 2—2, and the subsequent reduction and volatilization, or reduction and oxidation and volatilization are accomplished with little or no formation of sulphides and without the disadvantages which arise from the presence of such sulphides in the ordinary operations.

I have also provided an ideal method of introducing material, both the ore and the coke or coal, in the case illustrated, into this cement kiln type of furnace. Scoops 5 and 6 are fastened to the outside of the shell and deliver material to the inside of the furnace through holes 7 and 8 which are inclined so that the charge is slid rather than dropped into the furnace. Thus, very little dusting takes place. Also, the feeding by this method is very uniform. Inclined blades 9 may be used to advance the material and prevent clogging adjacent to the openings.

The scoops revolve in tight boxes 10 and 11 surrounding the furnace and kept full of material, so that as the scoops rise they take up the charge and slide it into the furnace.

Various modifications may be made by those skilled in the art without departing from the invention as defined in the following claims.

What I claim is:—

1. In the recovery of volatile metals from sulphur bearing ores by reduction and volatilization, the method which consists in feeding the ore to the admission end of a kiln, adding reducing material at a further point in the kiln and passing heating gas from the discharge end through the kiln so as to first reduce and volatilize the charge and then to preliminarily calcine the ore.

2. In the recovery of volatile metals from sulphur bearing ores by reduction and volatilization, the method which consists in feeding the ore to the admission end of downwardly inclined rotary kiln, adding reducing material at a further point in the kiln and passing heating gas from the discharge end through the kiln so as to first reduce and volatilize the charge and then to preliminarily calcine the ore.

3. The method of recovering volatile metals from sulphur bearing ores which comprises heating a mixture of ore and reducing agent by an oxidizing flame, re-oxidizing the reduced and volatilized metal by said flame, and thereafter calcining metallic sulphides by said hot flame, and supplying said calcined ore to said reducing operation.

4. A process of recovering volatile metals from sulphur bearing ores which comprises reducing calcined ore with a reducing agent, volatilizing the reduced metal, oxidizing said volatilized metal in an oxidizing blast, and calcining additional ore directly by said blast, and subjecting said calcined additional ore to said reduction.

5. A process of recovering volatile metals from sulphur bearing ores which comprises reducing calcined ore with a reducing agent, volatilizing the reduced metal, heating said ore during reduction with an oxidizing blast, oxidizing the volatilized metal in said blast, and calcining additional ore directly by said blast, and subjecting said calcined additional ore to said reduction.

6. A process of recovering volatile metals from sulphur bearing ores which comprises reducing and volatilizing the metal of calcined ore into an oxidizing and heating atmosphere, and then roasting the sulphide ore directly by said hot atmosphere, and subjecting said calcined additional ore to said reduction.

In witness whereof, I have hereunto signed my name.

ERNEST KLEPETKO.